(12) United States Patent
Onishi

(10) Patent No.: US 11,926,234 B2
(45) Date of Patent: Mar. 12, 2024

(54) CHARGING SYSTEM FOR ELECTRIC VEHICLE

(71) Applicant: TOYOTA JIDOSHA KABUSHIKI KAISHA, Toyota (JP)

(72) Inventor: Yoichi Onishi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 678 days.

(21) Appl. No.: 17/131,056

(22) Filed: Dec. 22, 2020

(65) Prior Publication Data

US 2021/0237604 A1 Aug. 5, 2021

(30) Foreign Application Priority Data

Jan. 31, 2020 (JP) .................................. 2020-015568

(51) Int. Cl.
*H02J 7/00* (2006.01)
*B60L 53/50* (2019.01)
*B60L 53/60* (2019.01)
*B60L 53/66* (2019.01)
*B60L 53/68* (2019.01)

(52) U.S. Cl.
CPC .............. *B60L 53/60* (2019.02); *B60L 53/50* (2019.02); *B60L 53/66* (2019.02); *B60L 53/68* (2019.02); *B60L 2240/26* (2013.01); *G06Q 2240/00* (2013.01); *Y02T 90/12* (2013.01); *Y02T 90/14* (2013.01)

(58) Field of Classification Search
CPC .......... B60L 53/50; B60L 53/60; B60L 53/66; B60L 53/68; B60L 2240/26; G06Q 2240/00; Y02T 90/12; Y02T 90/14

USPC ............................................. 320/109; 701/22
See application file for complete search history.

(56) References Cited

U.S. PATENT DOCUMENTS

| | | | | |
|---|---|---|---|---|
| 2009/0085522 A1* | 4/2009 | Matsumoto | ........... | B60W 10/26 320/137 |
| 2013/0029595 A1* | 1/2013 | Widmer | ................ | B60L 53/124 455/39 |

FOREIGN PATENT DOCUMENTS

| | | |
|---|---|---|
| JP | H6-318288 A | 11/1994 |
| JP | 2011-103721 A | 5/2011 |
| JP | 2011-167041 A | 8/2011 |
| JP | 2013-186519 A | 9/2013 |
| JP | 2013186519 A * | 9/2013 |
| JP | 2015-041300 A | 3/2015 |
| JP | 2019-086923 A | 6/2019 |

* cited by examiner

*Primary Examiner* — Zixuan Zhou
(74) *Attorney, Agent, or Firm* — Oliff PLC

(57) ABSTRACT

A charging system for an electric vehicle disclosed herein may include a charger and a monitoring device. The monitoring device may be configured to output a warning message urging a person to return to a charging area in which the charger is connected to the electric vehicle when detecting the person has left the charging area after the charger started charging the electric vehicle. This charging system may be configured to output the warning message to urge the person to return to the charging area when detecting the person has left the charging area after the charger started charging the electric vehicle. Outputting such a first message may allow the electric vehicle to leave the charging area soon after charging has been completed.

6 Claims, 6 Drawing Sheets

CHARGING SYSTEM FOR ELECTRIC VEHICLE

CROSS-REFERENCE TO RELATED APPLICATION

This application claims priority to Japanese Patent Application No. 2020-15568 filed on Jan. 31, 2020, the contents of which are hereby incorporated by reference into the present application.

TECHNICAL FIELD

The technique disclosed herein relates to a charging system configured to charge electric vehicles. Especially, the technique relates to a charging system which can efficiently charge electric vehicles one after another.

BACKGROUND

As electric vehicles become widespread, studies on charging facilities have been in progress. For example, charging systems are described in Japanese Patent Application Publications Nos. 2011-103721, 2011-167041, 2019-86923, H06-318288, 2015-41300. In order to efficiently charge multiple electric vehicles, in the charging system of Japanese Patent Application Publication No. 2011-103721, a message urging a user of an electric vehicle to leave a charging area is outputted to a user's cell phone when the electric vehicle does not move despite a predetermined permissible time having elapsed from when charging was completed. Further, the charging system of Japanese Patent Application Publication No. 2011-103721 impose an excess fee on a user who is parking an electric vehicle over a long period of time even after the charging was completed.

In the charging system of Japanese Patent Application Publication No. 2011-167041, a message which announces that charging will be completed soon is sent to an e-mail address of a user who is in a place far from his/her electric vehicle.

SUMMARY

In order to efficiently charge multiple electric vehicles one after another, a technique which strongly urges an electric vehicle to leave a charging area soon after the charging of the electric vehicle is completed is desired.

A charging system for an electric vehicle disclosed herein may comprise a charger and a monitoring device. The monitoring device may be configured to output a first message urging a person to return to a predetermined area in which the charger is connected to the electric vehicle when detecting the person has left the predetermined area after the charger started charging the electric vehicle. Hereafter, the predetermined area is referred to as "charging area". This charging system is configured to output the first message to urge the person to return to the charging area when detecting the person has left the charging area after the charger started charging the electric vehicle. Outputting such a first message allows the electric vehicle to leave the charging area soon after charging has been completed.

In order to detect that the person has left the charging area, a weight scale configured to measure a weight of an object in the charging area may be employed, for example. The monitoring device may be configured to store a value measured by the weight scale (an initial weight) when the electric vehicle entered the charging area and output the first message when a weight measured by the weight scale becomes lighter than the initial weight by a predetermined permissible weight or more after the charger started charging the electric vehicle.

Alternatively, in order to detect that the person has left the charging area, a camera configured to capture images of the charging area and an image processing apparatus configured to analyze the images captured by the camera may be employed. The monitoring device including the image processing apparatus is configured to output the first message when detecting, from the images captured by the camera, the person has gotten out of the electric vehicle in the charging area and has left the charging area.

The first message may be realized as a voice or an alarm sound outputted from a speaker, or an alarm lamp being turned on.

The monitoring device may output the first message when detecting a user of the electric vehicle has left the charging area, instead of outputting the first message when detecting an unidentified person has left the charging area.

The monitoring device of the charging system disclosed herein may be configured to output a second message urging the person to move the electric vehicle out of the charging area when detecting the electric vehicle is in the charging area despite a predetermined permissible post-charging time having elapsed from when a charging time exceeded a predetermined charging time. Alternatively, the monitoring device disclosed herein may be configured to output a second message urging the person to move the electric vehicle out of the charging area when the electric vehicle is in the charging area despite a predetermined permissible post-charging time having elapsed from when an amount of electric power charged to the electric vehicle reached a predetermined amount. These configurations can prevent the electric vehicle which has completed charging from staying in the charging area for a long period of time.

The monitoring device disclosed herein may be configured to output a third message urging the person to start charging the electric vehicle when detecting the charger does not start charging the electric vehicle despite a predetermined permissible pre-charging time having elapsed from when the electric vehicle entered the charging area. This configuration can prevent the electric vehicle from staying in the charging area for a long period of time without being charged.

Details and further improvements of the technique disclosed herein will be described in DETAILED DESCRIPTION below.

DETAILED DESCRIPTION

Figure 1:
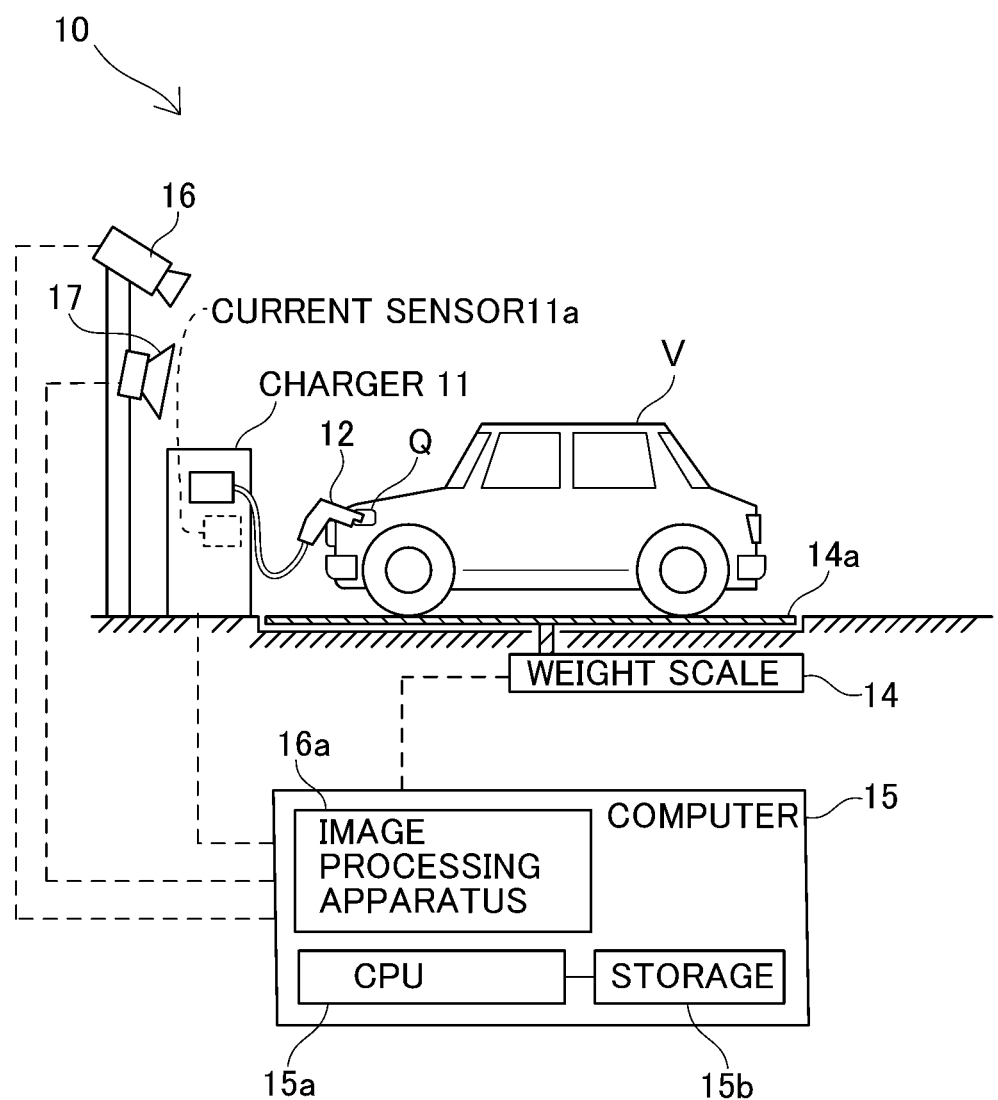
FIG. 1 schematically shows a charging system of an embodiment.

A charging system 10 of an embodiment will be described with reference to drawings. FIG. 1 shows a schematic block diagram of the charging system 10. In FIG. 1, broken lines indicate signal lines.

The charging system 10 includes a charger 11, a weight scale 14, a computer 15, a camera 16, and a speaker 17. The charger 11, the weight scale 14, the camera 16, and the speaker 17 are connected to the computer 15. The computer 15 is a controller of the charging system.

The weight scale 14 is configured to measure a weight of an object on a measurement plate 14a. The measurement plate 14a is disposed on a ground plane in front of the charger 11, and an electric vehicle V is to be parked on the measurement plate 14a. An area within the measurement plate 14a corresponds to a charging area. More specifically, the weight scale 14 is configured from the measurement plate 14a made of metal and corresponding to the charging area, a load cell configured to measure a weight of an object on the measurement plate 14a, and a computer configured to convert an output from the load cell to a weight. The road cell is disposed between the measurement plate 14a and the ground plane.

An image processing apparatus 16a configured to analyze images captured by the camera 16 is incorporated in the computer 15. The camera 16 is configured to capture images of the charging area (i.e., the area within the measurement plate 14a). The computer 15 can detect that the electric vehicle V has entered the charging area by analyzing the images captured by the camera 16. The image processing apparatus 16a may be realized by a program which the computer 15 executes, or may be realized by hardware different from the computer 15.

The computer 15 includes a Central Processing Unit (CPU) 15a and a storage 15b, and is configured to realize various functions by the CPU 15a executing a program stored in the storage 15b. The computer 15 is configured to control charging of a vehicle parked in the charging area and monitor the vehicle such that the vehicle does not stay in the charging area over a long period of time. In other words, the computer 15 is also a monitoring device.

The charger 11 includes a charging plug 12 to be connected to the electric vehicle V. The charger 11 is configured to supply electric power to the electric vehicle V via the charging plug 12. The electric vehicle V charges a battery mounted thereon (a battery for driving an electric traction motor) in response to receiving the electric power from the charger 11.

A user of the electric vehicle V plugs the charging plug 12 into an inlet Q of the electric vehicle V when the user wishes to charge the battery of his/her electric vehicle. The charging plug 12 includes a sensor, and the sensor can detect that the charging plug 12 has been plugged into the inlet Q. The computer 15 is notified that the charging plug 12 has been plugged into the inlet Q. When the charging plug 12 is plugged into the inlet Q, the computer 15 sends a command to the charger 11. The charger 11 which received the command starts charging the battery of the electric vehicle V.

A current sensor 11a is mounted in the charger 11, by which an amount of current outputted from the charging plug 12 can be measured. When the amount of current measured by the current sensor 11a is multiplied by a supply voltage, an amount of electric power supplied to the electric vehicle V from the charger 11 is determined. The computer 15 gets data of the amount of the current supplied to the electric vehicle V.

The charging system 10 is configured to stop charging when a certain period of time (a predetermined charging time) has elapsed after the charging was started so that multiple electric vehicles can be efficiently charged. Further, as described above, the charging system 10 is configured to monitor the electric vehicle V so that the electric vehicle V does not stay in the charging area over a long period of time. Processes that the computer 15 executes will be described with reference to flowcharts of FIGS. 2 to 6.

As described above, the charging system 10 includes the camera 16 configured to capture the images of the charging area (the measurement plate 14a), and the image processing apparatus 16a configured to analyze the images captured by the camera 16 is incorporated in the computer 15. When detecting, with the image processing apparatus 16a, that the electric vehicle V has entered the charging area, the computer 15 then starts the process of FIG. 2.

Firstly, the computer 15 measures a weight of an object on the measurement plate 14a (i.e., an object in the charging area) using the weight scale 14, and stores the weight (step S2). The weight measured in step S2 is referred to as an initial weight.

Next, the computer 15 starts a timer (step S3). The timer is a variable in the program which the computer 15 executes, and the variable indicates how much time has actually elapsed. The program (a monitoring program) which the computer 15 executes can identify how much time has elapsed after the timer was started by referring to a value of the timer.

The computer 15 checks whether or not the charging plug 12 has been connected to the electric vehicle V (step S4). The computer 15 monitors connection of the charging plug 12 over a predetermined first permissible time (step S6: NO). When detecting that the charging plug 12 has been connected to the electric vehicle V before the predetermined first permissible time elapses (step S6: NO), the computer 15 sends a command to the charger 11, and starts charging the battery mounted in the electric vehicle V (step S4: YES, step S5). The process after the charging is started will be described below.

When the computer 15 cannot detect that the charging plug 12 has been connected to the electric vehicle V despite a time which has elapsed from when the electric vehicle V entered the charging area exceeding the first permissible time (step S6: YES), the computer 15 outputs a warning message from the speaker 17 (step S7). The warning message outputted in step S7 is a message urging the user to connect the charging plug 12 to the electric vehicle V and start charging the electric vehicle V immediately.

The computer 15 regularly and repeatedly outputs the warning message of step S7. While maintaining to output the warning message, the computer 15 resets the timer in step S8 and recounts the elapsed time from zero. Then, the computer 15 checks whether the charging plug 12 has been connected to the electric vehicle V until a predetermined second permissible time elapses (step S12: NO, step S9). When the charging plug 12 is connected to the electric vehicle V before the second permissible time elapses, the computer 15 stops outputting the warning message (step S9: YES, step S10). Then, the computer 15 sends a command to the charger 11 to start charging the battery of the electric vehicle V (step S11). The process after the charging is started will be described below.

When the connection of the charging plug 12 to the electric vehicle V cannot be detected despite the second permissible time having elapsed after the warning message was outputted in step S7 (step S12: YES), the computer 15 informs a security staff to go to the charging area and check a situation thereof (step S13). The security staff operates the computer 15 and stops the warning message. When finding the user, the security staff has the user start charging the electric vehicle V. When the security staff cannot find the user, the security staff performs a predetermined handling procedure.

Figure 3:
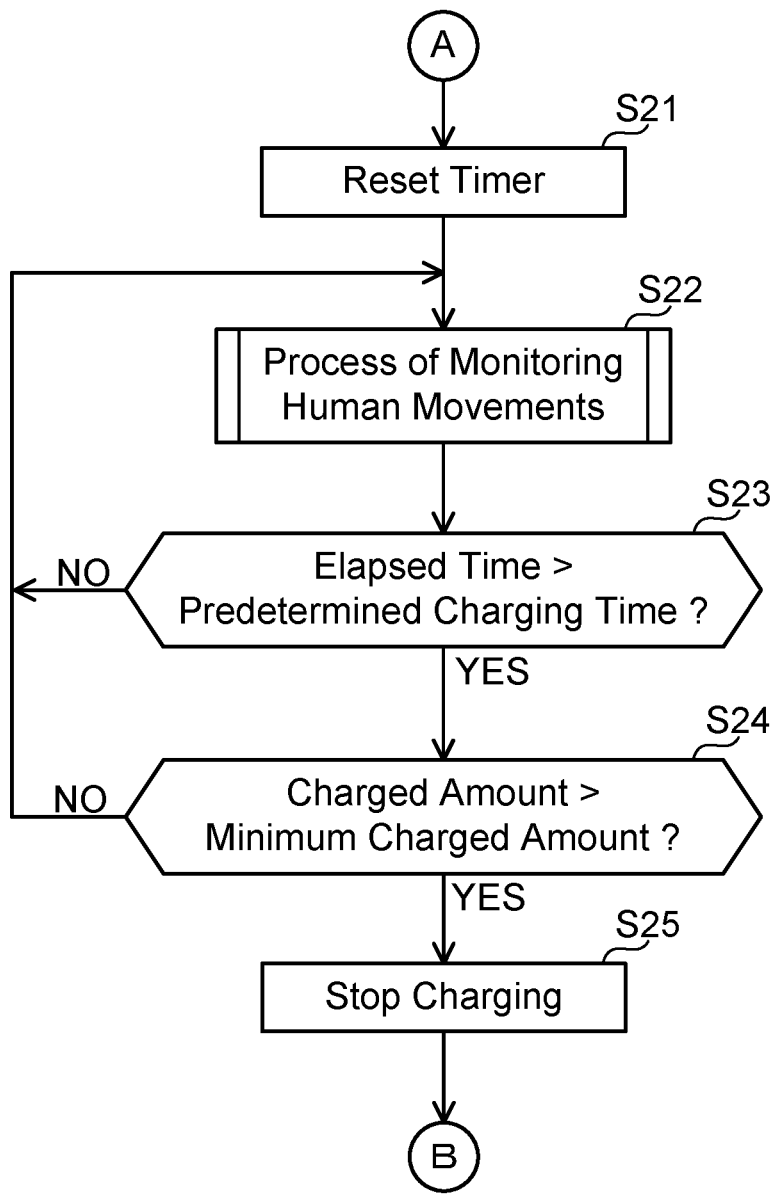
FIG. 3 shows a flowchart of a process which the charging controller executes (continuation of FIG. 2).

The process after the charging is started in step S5 or in S11 is illustrated in FIG. 3. When the charging is started, the computer 15 resets the timer and recounts the elapsed time from zero (step S21). Until the predetermined charging time elapses, the computer 15 keeps charging the electric vehicle V and repeatedly executes a process for monitoring human movements (step S22). The process for monitoring human movements (step S22) will be described later.

When the predetermined charging time elapses after the charging is started, the computer 15 compares the amount of electric power (a charged amount) supplied to the electric vehicle V and a predetermined minimum charged amount (step S23: YES, step S24). As described above, the data of the amount of the electric power that the charger 11 supplied to the electric vehicle V is transmitted to the computer 15 from the charger 11.

When the amount of electric power supplied to the electric vehicle V does not reach the predetermined minimum charged amount, the computer 15 keeps charging the electric vehicle V (step S24: NO, step S22). The minimum charged amount is set to an amount of electric power enough for the electric vehicle V to travel to a next charging system. The charging system 10 ensures supplying the electric vehicle V with the amount of electric power enough to travel to the next charging system.

When the time elapsed after the charging is started reaches the predetermined charging time and when the charged amount exceeds the minimum charged amount, the computer 15 stops the charging (step S23: YES, step S24: YES, step S25). The process after the charging is stopped will be described later.

The process for monitoring human movements (step S22) will be described. The process for monitoring human movements is a process for outputting a warning message when a person leaves the charging area (i.e., the area within the measurement plate 14a). When the person leaves the charging area, the electric vehicle V cannot be moved soon after the charging is completed. It is desirable that the electric vehicle V which completed the charging leaves the charging area immediately in order to charge multiple electric vehicles one after another. The charging system 10 is configured to output the warning message when the person leaves the charging area during the charging and urge the person to return to the charging area.

Figure 4:
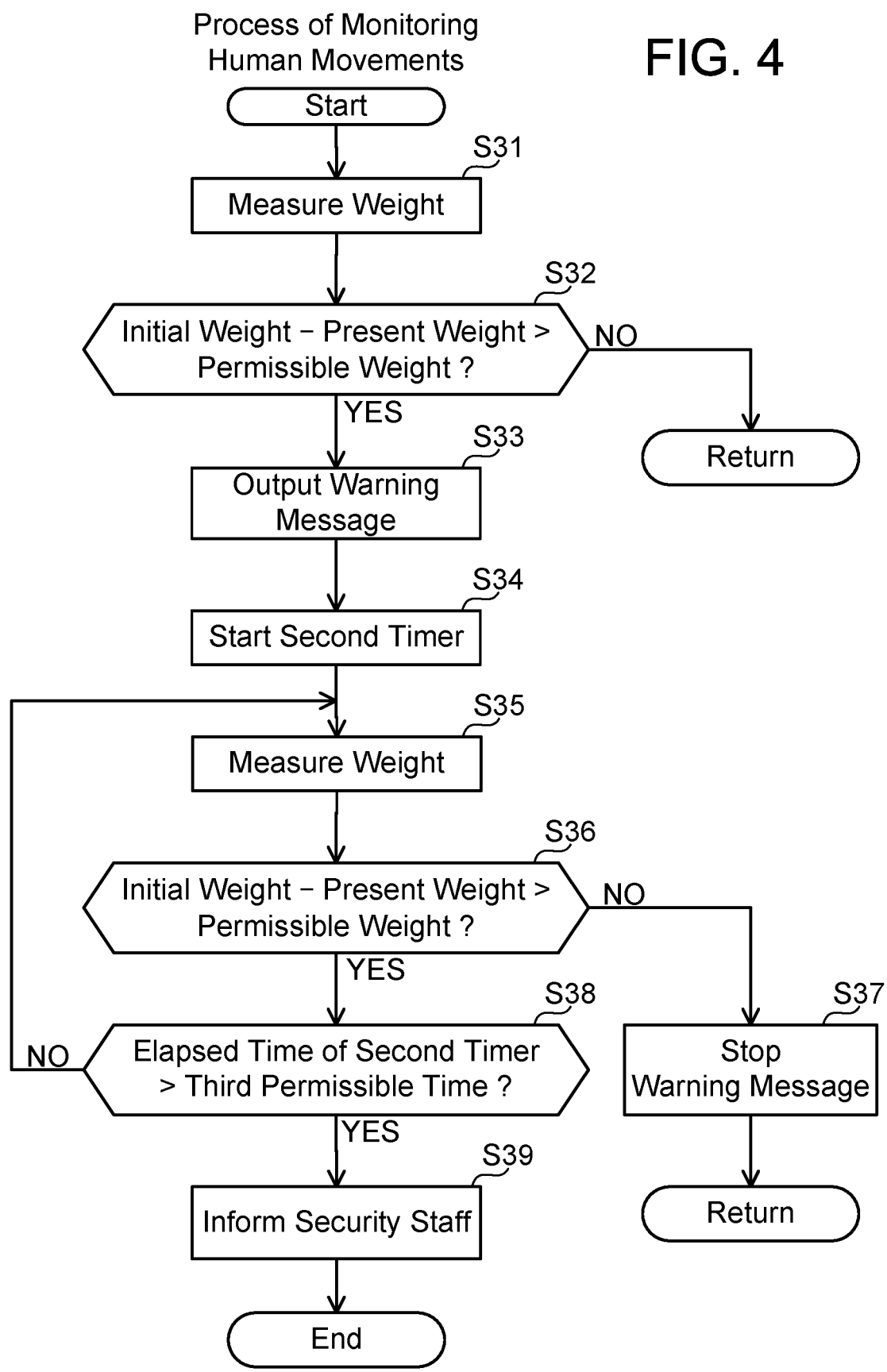
FIG. 4 shows a flowchart of a process for monitoring human movements.

FIG. 4 shows a flowchart of the process for monitoring human movements. As described in FIG. 3, the computer 15 regularly and repeatedly executes the process for monitoring human movements while the electric vehicle V is charged. Firstly, the computer 15 measures a weight of an object in the charging area (a weight of an object on the measurement plate 14a) using the weight scale 14 (step S31). The weight measured in step S31 is referred to as a "present weight".

The computer 15 checks whether a difference between the initial weight (the weight measured in step S2 of FIG. 2) and the present weight exceeds a predetermined permissible weight (step S32). The weight difference is determined by subtracting the present weight from the initial weight. The permissible weight is set as a value slightly lighter than a lowest value of a weight range of adults (e.g., 30 kg). When the difference between the initial weight and the present weight is smaller than the permissible weight, it is highly likely that no person has left the charging area (the measurement plate 14a). In such a case, the computer 15 terminates the process for monitoring human movements without executing any other process (step S32: NO, return).

On the other hand, when the difference between the initial weight and the present weight is greater than the permissible weight, it is highly likely that at least one person has left the charging area (the measurement plate 14a). In such a case (step S32: YES), the computer 15 outputs the warning message from the speaker 17 (step S33). The warning message outputted in step S33 is a message strongly urging the person(s) to return to the charging area.

The computer 15 regularly and repeatedly outputs the warning message of step S33. The computer 15 starts another timer (a second timer) in step S34 while maintaining to output the warning message. The second timer is also a variable in the program which the computer 15 executes, and is a timer for measuring a time elapsed after the computer 15 detected that the person(s) has left the charging area in step S32.

During a period before the elapsed time measured by the second timer exceeds a predetermined third permissible time, the computer 15 measures the weight of the object in the charging area by the weight scale 14 (step S35) and checks if the difference between the newly measured weight (a present weight measured in step 35) and the initial weight exceeds the permissible weight (step S36). In step S36 as well, the weight difference is determined by subtracting the present weight from the initial weight. When the difference between the initial weight and the present weight becomes smaller than the permissible weight before the third permissible time elapses (step S36: NO), the computer 15 determines that the person(s) who left the charging area has returned, stops outputting the warning message (step S37), and returns to a routine of FIG. 3 (step S23 of FIG. 3).

When the difference between the initial weight and the present weight is still not smaller than the permissible weight despite the third permissible time having elapsed from when the warning message was outputted in step S33 (step S36: YES, S38: YES), the computer 15 informs the security staff to go to the charging area and check the situation thereof (step S39). The security staff operates the computer 15 and stops the warning message. The security staff acts depending on a situation such that occupant(s) of the electric vehicle V stay in the charging area.

Figure 5:
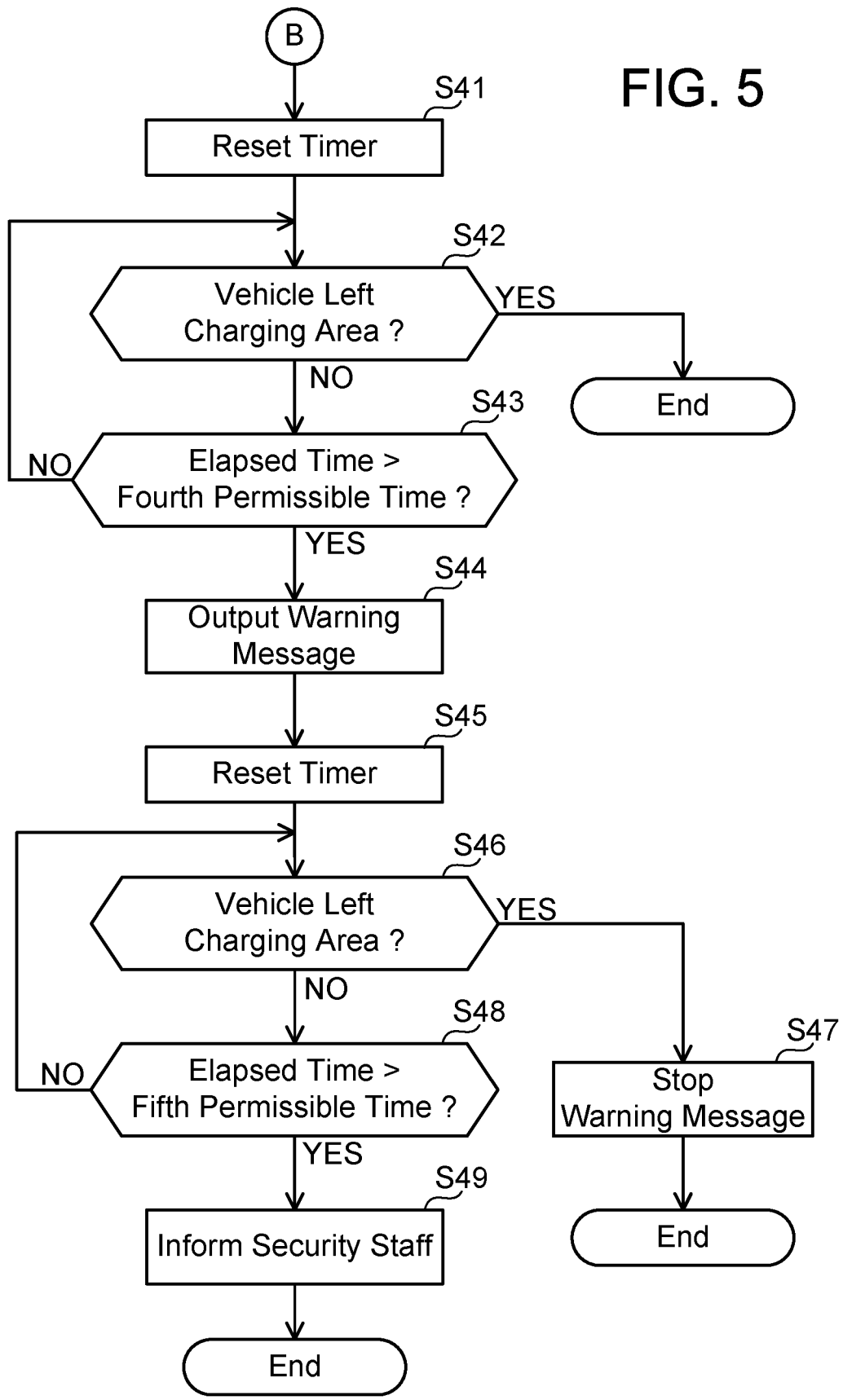
FIG. 5 shows a flowchart of a process which the charging controller executes (continuation of FIG. 3).

FIG. 5 shows a process continuing from FIG. 3. After stopping the charging in step S25 of FIG. 3, the computer 15 resets the timer (step S41). Then, the computer 15 analyzes the images of the charging area captured by the camera 16, and checks whether the electric vehicle V has left the charging area or not (step S42). When the electric vehicle left the charging area before a fourth permissible time elapses after the charging was stopped (step S42: YES), the computer 15 terminates the process, and prepares for charging of an electric vehicle coming next.

When the electric vehicle V is in the charging area despite the elapsed time counted by the timer having exceeded the predetermined fourth permissible time after the charging was stopped in step S25 in FIG. 3 (step S42: NO, step S43: YES), the computer 15 outputs a warning message from the speaker 17 (step S44). The warning message outputted in step S44 is a message urging the electric vehicle V to leave the charging area soon after the charging is terminated.

The computer 15 regularly and repeatedly outputs the warning message of step S44. While maintaining to output the warning message, the computer 15 resets the timer in step S45 and recounts the elapsed time from zero. Then, when the electric vehicle V left the charging area before a predetermined fifth permissible time elapses, the computer 15 stops outputting the warning message and terminates the process (step S46: YES, step S47).

When the electric vehicle V is in the charging area despite the fifth permissible time having elapsed from when the warning message was outputted in step S44 (step S48: YES), the computer 15 informs the security staff (step S49) to go to the charging area and check the situation thereof. The security staff finds the user of the electric vehicle V and requests the user to immediately leave the charging area.

As described above, the charging system 10 of the embodiment is configured to output the warning message to urge the person to return to the charging area when the person leaves the charging area during the charging. Further, when there is a redundant time before the charging is stated or after the charging is completed, the charging system 10 outputs the warning message and urges the user of the electric vehicle V to act immediately. The charging system 10 is suitable for promptly charging multiple electric vehicles one after another.

Figure 2:
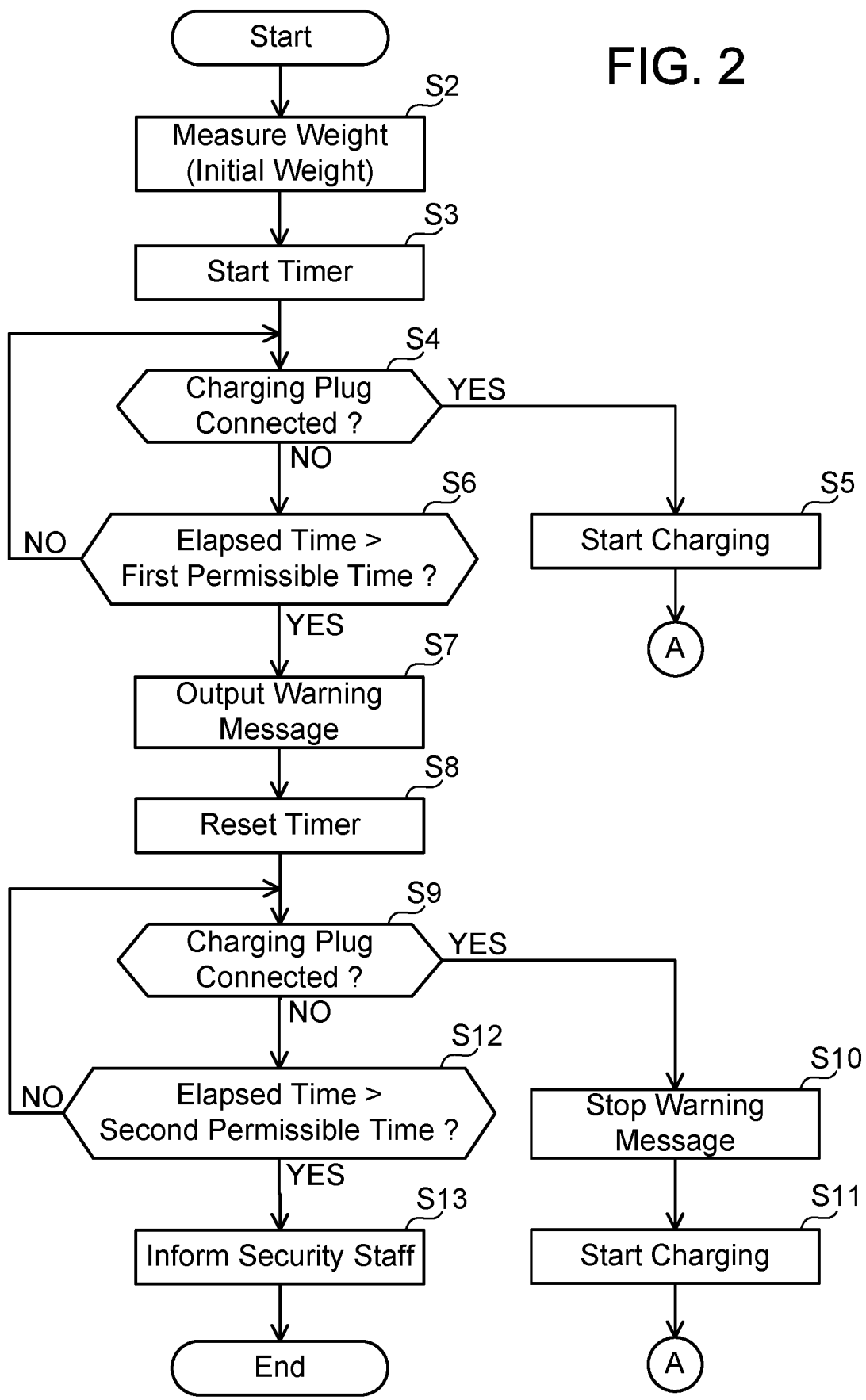
FIG. 2 shows a flowchart of a process which a charging controller (a computer 15) executes.
Figure 6:
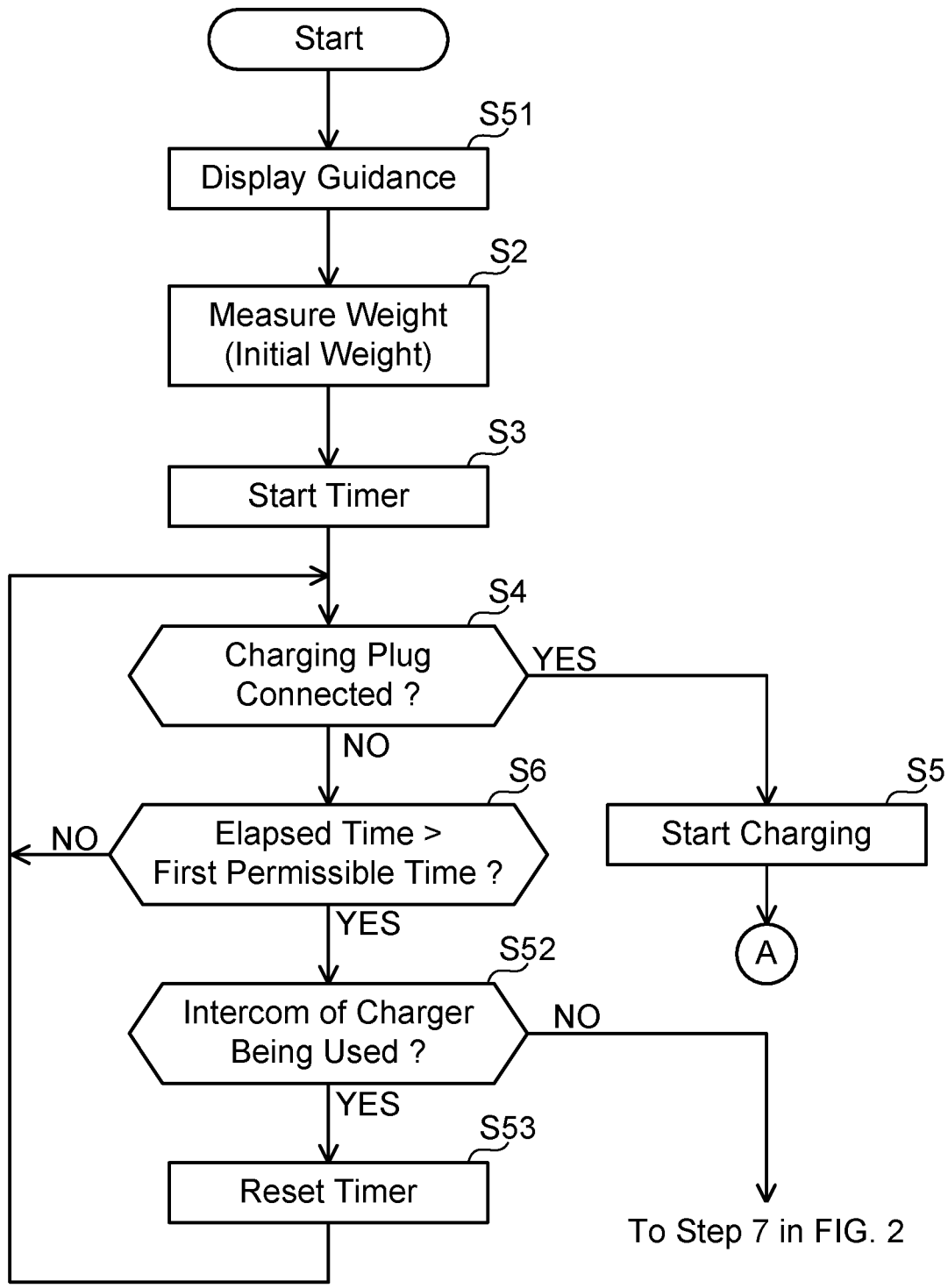
FIG. 6 shows a flowchart of a variant of a process which the charging controller executes.

FIG. 6 shows a variant of the process of FIG. 2. Steps S2 to S6 of FIG. 6 are identical to steps S2 to S6 of FIG. 2. In the variant illustrated in FIG. 6, steps S51, S52, S53 are added to the flowchart of FIG. 2.

Before the charging is started, the computer 15 displays a guidance for using the charger 11 on a display device (not shown in FIG. 1) included in the charger 11 (step S51). When the computer 15 cannot detect that the charging plug 12 is connected to the electric vehicle V despite the first permissible time having elapsed from when the initial weight was measured (step S6: YES), the computer 15 checks whether an intercom mounted in the charger 11 is being used or not (step S52). When the intercom is being used, it is highly likely that the user of the electric vehicle V parked in the charging area is talking with a staff of a charging facility. In this case, there is a high possibility that the user cannot start the charging for some reason. In such a case (step S52: YES), the computer 15 resets the timer which was started in step S3 (step S53). In other words, when the intercom is being used, the computer 15 extends the period for monitoring the connection of the charging plug 12. When the elapsed time exceeds the first permissible time and the intercom is not used (step S6: YES, step S52: NO), the computer 15 executes step S7 of FIG. 2 (i.e., outputting of the warning message).

Other variants will be described. When the charging system 10 is installed in a huge facility which the user may use, such as a shopping mall, a message urging the user of the charging system 10 to return to the charging area may be announced in the facility as well as the output of the warning message of step S44. A license plate number of the electric vehicle V may be captured by the camera 16 and read by the image processing apparatus 16a, and the license plate number may be announced in the facility.

The charging system 10 may include a detaining device configured to detain the electric vehicle V when the electric vehicle V is in the charging area despite the fourth permissible time having elapsed from when the charging was finished. The detaining device may be, for example, a device which causes stoppers to respectively protrude in front of and behind wheels (or between the wheels). Further, the computer 15 may release the electric vehicle V when a predetermined excess fee is paid to the charging system 10.

Points related to the technique described in the embodiment will be described. The warning message outputted by the computer 15 in step S7 of FIG. 2 is a message urging the person to start the charging when the charger 11 does not start charging the electric vehicle V despite the first permissible time (a pre-charging permissible time) having elapsed from when the electric vehicle V entered the charging area. This warning message is an example of the third message.

The warning message outputted by the computer 15 in step S33 of FIG. 4 is a message urging the person to return to the charging area. This warning message is an example of the first message.

The warning message outputted by the computer 15 in step S44 of FIG. 5 is a message urging the person to move the electric vehicle out of the charging area when the electric vehicle V is in the charging area despite a predetermined post-charging permissible time having elapsed from when the charging was finished. This warning message is an example of the second message. In the charging system 10 of the embodiment, when the electric vehicle V is in the charging area despite the fourth permissible time (the post-charging permissible time) having elapsed from when the predetermined charging time elapsed (step S23: YES), the computer 15 outputs the second message. Alternatively, when the electric vehicle V is in the charging area despite the fourth permissible time (the post-charging permissible time) having elapsed from when the amount of electric power supplied to the electric vehicle V reached the minimum charged amount (step S24: YES), the computer 15 outputs the second message. In the embodiment, the minimum charged amount is set to the amount of electric power enough for the electric vehicle V to travel to the next charging system. The minimum charged amount of step S24 may be a predetermined amount of electric power designated by the user (or designated by the charging system 10).

The charging system 10 of the embodiment is configured to detect that the person has left the charging area by the weight scale 14. The charging system 10 of the embodiment may be configured to detect that the person has left the charging area by the camera 16 configured to capture the images of the charging area and the image processing apparatus 16a configured to analyzes the images captured by the camera 16.

Further, the computer 15 may be configured to identify a person operating the charger 11 by the camera 16 and the image processing apparatus 16a, and may identify him/her as a user of the electric vehicle V. Then, the computer 15 may be configured to output the warning message urging the identified person (the user of the electric vehicle V) to return to the charging area when he/she has left the charging area during the charging. The charging system 10 may be configured to identify the user by reading information of a membership card which the user possesses.

The charging system 10 may include an automatic payment machine disposed at an entrance/exit of the charging area, and the automatic payment machine may be configured to charge the user with a fee depending on a parking time and a charged amount. The fee the user is charged may be withdrawn from an account of the user via the Internet.

The computer 15 of the charging system 10 of the embodiment is an example of the monitoring device.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A charging system for an electric vehicle, the charging system comprising:
   a charger configured to charge the electric vehicle; and
   a monitoring device configured to output a first message urging a person to return to a charging area in which the charger is connected to the electric vehicle when detecting the person has left the charging area after the charger started charging the electric vehicle.

2. The charging system of claim 1, wherein the monitoring device is configured to output a second message urging the person to move the electric vehicle out of the charging area when detecting the electric vehicle is in the charging area despite a predetermined permissible post-charging time having elapsed from when an amount of electric power charged to the electric vehicle reached a predetermined amount or from when a charging time exceeded a predetermined charging time.

3. The charging system of claim 1, wherein the monitoring device is configured to output a third message urging the person to start charging the electric vehicle when detecting the charger does not start charging the electric vehicle despite a predetermined permissible pre-charging time having elapsed from when the electric vehicle entered the charging area.

4. The charging system of claim 1, wherein the monitoring device is configured to identify a user of the electric vehicle and output the first message when detecting the user has left the charging area.

5. The charging system of claim 1, further comprising a weight scale configured to measure a weight of an object in the charging area,
   wherein the monitoring device is configured to:
   store an initial weight measured by the weight scale when the electric vehicle entered the charging area; and
   output the first message when a weight measured by the weight scale becomes lighter than the initial weight by a predetermined permissible weight or more after the charger started charging the electric vehicle.

6. The charging system of claim 1, further comprising a camera configured to capture images of the charging area,
   wherein the monitoring device is configured to output the first message when detecting, from the images captured by the camera, the person has gotten out of the electric vehicle in the charging area and has left the charging area.

* * * * *